US010002384B1

(12) United States Patent
Fink et al.

(10) Patent No.: US 10,002,384 B1
(45) Date of Patent: Jun. 19, 2018

(54) AUTOMATED CARD NOTIFICATION SYSTEM AND METHOD

(75) Inventors: Marc J. Fink, West Chester, PA (US); Robert Birnbaum, Wilmington, DE (US); Matthew John McGough, Tobyhanna, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 1507 days.

(21) Appl. No.: 11/961,077

(22) Filed: Dec. 20, 2007

(51) Int. Cl.
*G06Q 40/02* (2012.01)

(52) U.S. Cl.
CPC .................................. *G06Q 40/025* (2013.01)

(58) Field of Classification Search
CPC ................................................... G06Q 40/025
USPC ................. 235/379, 380; 705/35, 39, 40, 44
See application file for complete search history.

(56) References Cited

U.S. PATENT DOCUMENTS

| | | | | |
|---|---|---|---|---|
| 4,321,672 A * | 3/1982 | Braun et al. | ..................... | 705/42 |
| 5,220,501 A * | 6/1993 | Lawlor et al. | .................. | 705/40 |
| 5,359,183 A | 10/1994 | Skodlar | | |
| 5,704,046 A * | 12/1997 | Hogan | ............................ | 705/39 |
| 5,742,845 A * | 4/1998 | Wagner | .......................... | 710/11 |
| 5,754,655 A * | 5/1998 | Hughes et al. | ................. | 705/70 |
| 5,777,903 A | 7/1998 | Piosenka et al. | | |
| 5,878,337 A * | 3/1999 | Joao et al. | ..................... | 455/406 |
| 6,032,135 A * | 2/2000 | Molano et al. | ................. | 705/41 |
| 6,041,314 A * | 3/2000 | Davis | .............................. | 705/41 |
| 6,064,990 A * | 5/2000 | Goldsmith | ....................... | 705/75 |
| 6,097,606 A * | 8/2000 | Groves et al. | ................. | 361/747 |
| 6,105,008 A * | 8/2000 | Davis et al. | ..................... | 705/41 |
| 6,125,349 A * | 9/2000 | Maher | ............................. | 705/1.1 |
| 6,327,376 B1 * | 12/2001 | Harkin | .......................... | 382/124 |
| 6,327,578 B1 * | 12/2001 | Linehan | ......................... | 705/65 |
| 6,360,954 B1 * | 3/2002 | Barnardo | ...................... | 235/492 |
| 6,457,650 B1 | 10/2002 | Suzuki et al. | | |
| 6,575,362 B1 * | 6/2003 | Bator et al. | .................... | 235/381 |
| 6,655,587 B2 * | 12/2003 | Andrews et al. | ............. | 235/383 |
| 7,080,782 B2 * | 7/2006 | Charrin | ......................... | 235/451 |
| 7,251,501 B2 * | 7/2007 | Halpern | ........................ | 455/558 |
| 7,329,186 B2 | 2/2008 | Gadda et al. | | |
| 7,611,411 B2 | 11/2009 | Gadda et al. | | |
| 7,685,328 B2 * | 3/2010 | Fruhauf et al. | ................. | 710/11 |
| 7,780,525 B2 * | 8/2010 | Walker et al. | .................. | 463/29 |
| 7,828,220 B2 | 11/2010 | Mullen | | |
| 7,931,195 B2 | 4/2011 | Mullen | | |
| 7,946,498 B2 | 5/2011 | Chiu | | |
| 7,954,705 B2 | 6/2011 | Mullen | | |

(Continued)

*Primary Examiner* — Shahid Merchant
*Assistant Examiner* — Martin A Gottschalk
(74) *Attorney, Agent, or Firm* — LeClairRyan PLLC

(57) ABSTRACT

A system, method, and card are disclosed for operating in conjunction with a financial account in order to automatically convey information to an account holder by directing the information to the card associated with the financial account. The card may include a display. The system may include an event detection module for detecting an event related to the financial account, a message selection component for selecting an account-related message corresponding to the event detected by the detection module, and a message generation module for generating the account-related message and transmitting the account-related message to the card associated with the financial account. The card conveys the account-related message on the display and may prompt the user to contact a card issuer.

34 Claims, 7 Drawing Sheets

(56) References Cited

U.S. PATENT DOCUMENTS

| | | |
|---|---|---|
| 8,002,193 B2 | 8/2011 | Faith et al. |
| 8,011,577 B2 | 9/2011 | Mullen et al. |
| 8,308,059 B2 | 11/2012 | Granucci et al. |
| 8,381,995 B2 | 2/2013 | Faith et al. |
| 2001/0003445 A1 | 6/2001 | Gauther et al. |
| 2004/0169722 A1* | 9/2004 | Pena .......................... 348/14.01 |
| 2005/0050324 A1* | 3/2005 | Corbett et al. ................ 713/168 |
| 2005/0065884 A1 | 3/2005 | Capurso et al. |
| 2005/0236491 A1* | 10/2005 | Leaming ...................... 235/492 |
| 2006/0040741 A1 | 2/2006 | Griswold et al. |
| 2007/0033150 A1* | 2/2007 | Nwosu ............................. 705/76 |
| 2007/0121848 A1* | 5/2007 | Faber et al. ............. 379/114.13 |
| 2008/0029607 A1 | 2/2008 | Mullen |
| 2008/0035738 A1 | 2/2008 | Mullen |
| 2008/0054068 A1 | 3/2008 | Mullen |
| 2008/0054079 A1 | 3/2008 | Mullen |
| 2008/0054081 A1 | 3/2008 | Mullen |
| 2008/0065555 A1 | 3/2008 | Mullen |
| 2008/0099556 A1 | 5/2008 | Park |
| 2008/0128516 A1* | 6/2008 | Na et al. ........................ 235/492 |
| 2008/0176645 A1 | 7/2008 | Gadda et al. |
| 2008/0201265 A1* | 8/2008 | Hewton .......................... 705/67 |
| 2008/0207128 A1* | 8/2008 | Mikko ......................... 455/41.2 |
| 2008/0302869 A1 | 12/2008 | Mullen |
| 2008/0302876 A1 | 12/2008 | Mullen |
| 2008/0318655 A1* | 12/2008 | Davies ........................... 463/16 |
| 2009/0037193 A1* | 2/2009 | Vempati et al. .................. 705/1 |
| 2009/0064301 A1* | 3/2009 | Sachdeva et al. ................ 726/9 |
| 2009/0075592 A1* | 3/2009 | Nystrom et al. ............. 455/41.1 |
| 2009/0078777 A1 | 3/2009 | Granucci et al. |
| 2009/0093269 A1* | 4/2009 | Lee ........................... 455/552.1 |
| 2009/0275364 A1* | 11/2009 | Morel et al. .................. 455/558 |

\* cited by examiner

AUTOMATED CARD NOTIFICATION SYSTEM AND METHOD

TECHNICAL FIELD

Embodiments of the invention are related generally to systems and methods for providing information related to a financial account to an account holder, and, more particularly, to a system and method for providing the account related message on a face of a card connected with the financial account.

BACKGROUND OF THE INVENTION

For many businesses, management of customer interaction is a critical component of the business that has become increasingly complex in an era of electronic commerce. For example, in the financial services industry, once a credit card has been issued, credit card issuers may have difficulties managing customer relationships. Customers may receive statements by mail or may receive electronic billing statements. Customers will often disregard communications sent in conjunction with this billing information.

Furthermore, communications from a card issuer to a customer that are sent by mail will often be discarded immediately as junk mail. Pop-up blockers and email spam filters may prevent customers from receiving electronic communications from credit card companies.

Often, in order to facilitate customized development of customer credit packages, a credit card issuer will attach a sticker to a standard credit card, giving the customer a telephone number to call in order to activate the card. Even if the customer is not required to make this initial telephone call, the sticker on the card can encourage the customer to make this initial telephone call. During this initial telephone call, the customer or new account holder will often be offered ancillary products, such as insurance or rewards that operate in conjunction with the existing account. Thus, a single communication between the customer and the credit issuer may result in a customized product for the customer that results in increased revenue for the credit card issuer.

Based on subsequent customer card usage, a card issuer can determine additional products in which the customer might be interested. Furthermore, the card issuer may want to notify a customer that a credit limit has been exceeded or that a potential fraudulent use had been detected. However, as set forth above, creating additional dialogue with a customer can be problematic. Existing solutions to this problem such as email notifications and mailings have been ineffective.

Thus, a solution is needed that takes advantage of evolving credit card technologies to establish contact with a credit cardholder. Such credit card technologies include the utilization of a light emitting polymer (LEP) display to communicate with the cardholder. A card having this display and other relevant features is disclosed in U.S. Pat. No. 6,631,849, which is hereby incorporated by reference. The LEP display is preferably thin and flexible may cover, for example, a portion of the surface of the card or it may cover the whole surface of at least one side of the card. Information and/or instructions may appear on the display. The information may, for example, be an image, characters, numbers or any combination thereof. denoting the credit card-issuing authority, the credit card company and its logo.

In addition to LEP displays, other types of displays are known in the art. The display may be a liquid crystal display (LCD), a field emission display (FED), a surface conduction electron-emitter display (SED), an interferometric modulator (IMOD) display or a vacuum fluorescent display (VFD). Other technologies may also be implemented.

Using these evolving card technologies, the solution should prompt a customer to contact the credit issuer by telephone, website, or other communication channel, thereby enabling the card issuer to communicate more effectively with customers.

BRIEF SUMMARY OF THE INVENTION

In one aspect of the invention, a system that operates in conjunction with a financial account is provided for automatically conveying information to an account holder by directing the information to a card associated with the financial account. The system includes an event detection module for detecting an event related to the financial account and a message selection component for selecting an account-related message corresponding to the event detected by the detection module. The system further includes a message generation module for generating the account-related message and transmitting the account-related message to the card associated with the financial account. The system may also include a display located on a face of the card associated with the financial account for displaying the account-related message.

In another aspect of the invention, a system that operates in conjunction with a financial account is provided for automatically conveying information to an account holder by directing the information to a card associated with the financial account. The system may include calendar components for generating at least one scheduled account-related indicator pertaining to the financial account and a message selection component for selecting an account-related message corresponding to the account related indicator. The system may additionally include a message generation module for generating the account-related message and transmitting the message to the card associated with the financial account and a display located on a face of the card associated with the financial account for displaying the account-related message.

In yet an additional aspect of the invention, a device associated with a financial account is provided. The device may include a signal receiving mechanism for receiving an account-related message from a remotely located message control engine, wherein the message control engine selects the account-related message based on detection of an account-related event. The device may additionally include a display on a face of the card for displaying the account-related message received through the signal receiving mechanism; and a processor for controlling the appearance of the account-related message on the display.

In yet an additional aspect, a computer-implemented method for automatically conveying information to a card associated with a financial account is provided. The computer-implemented method comprises detecting an event associated with the financial account and selecting a message corresponding to the event. The method may additionally include generating the selected message, transmitting the generated message to the card; and displaying the transmitted message on a display positioned on a face of the card.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to an automatic card notification system for notifying a holder of a card connected with a financial account when a relevant event occurs. The relevant event may be a detected card usage event, or alternatively a timed event, such as a billing due date. In embodiments of the invention, the notification prompts the cardholder to contact the card issuer at 1-800-555-5555 or other specific phone number.

Figure 1:
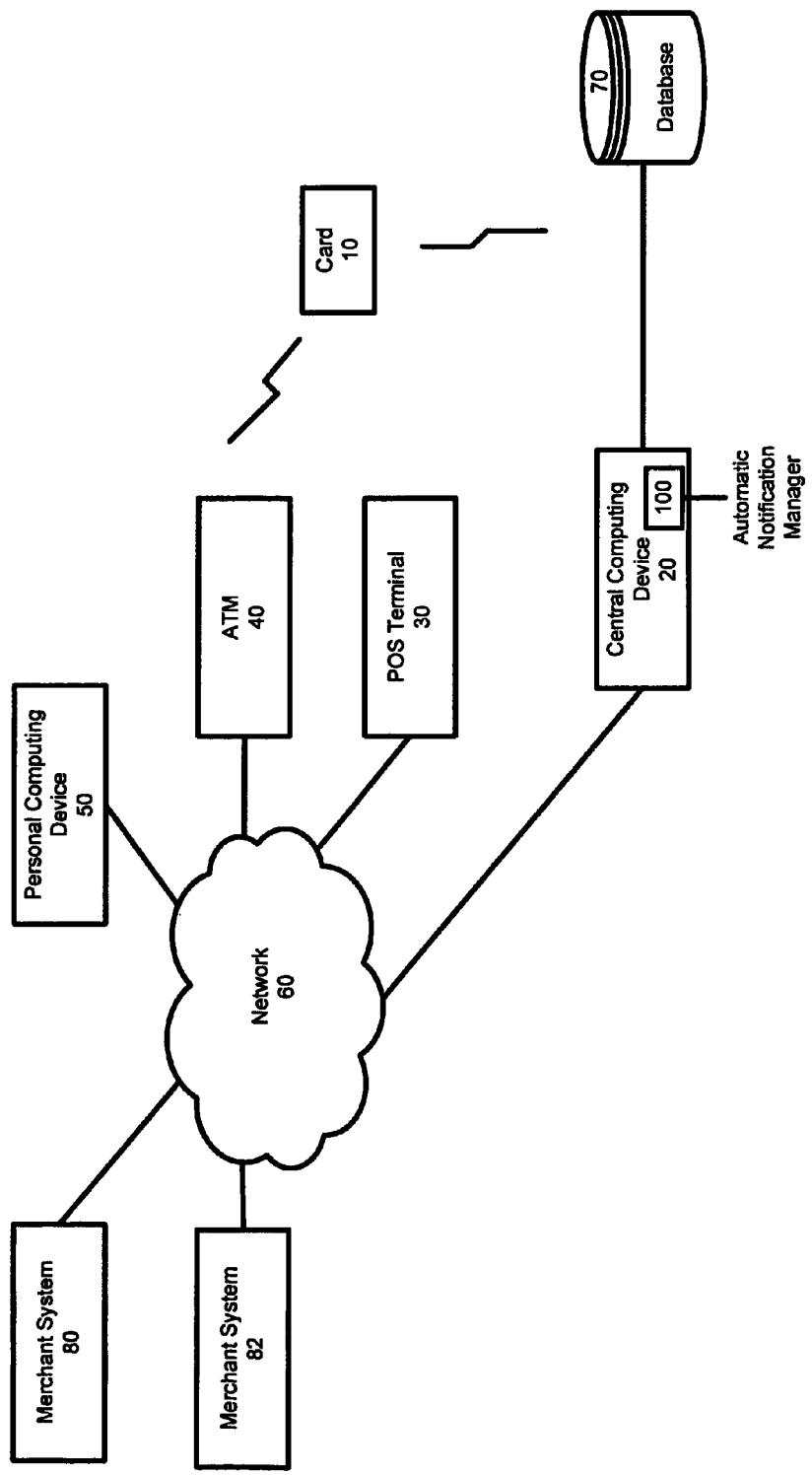
FIG. 1 is a block diagram illustrating an operating environment for an automatic card notification system in accordance with an embodiment of the invention.

FIG. 1 is a block diagram illustrating an operating environment for an automatic notification system in accordance with an embodiment of the invention. A card 10 having automatic notification components that will be further described below, may communicate with components such as a personal computing device 50, an automatic teller machine (ATM) 40, a point of sale POS terminal 30, and a central computing device 20. All of the components 20, 30, 40, and 50 may be connected over a network 60 and may communicate with merchant systems 80, 82.

The central computing device 20 may include an automatic notification manager 100 and may communicate with one or more databases 70. The database 70 and/or central computing device 20 may store account information pertaining to the account related to the card 10. Merchant systems 80, 82 may be connected over the network 60 with devices such as the POS terminal 30 and may attempt to complete transactions through the central computing device 20 based on usage of the card 10.

All of the components shown in FIG. 1, including the central computing device 20 containing the automatic notification manager 100, the merchants 80, 82, the personal computing device 50, the ATM 40, and the POS terminal 30 may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The automatic notification manager 100 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/ nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Figure 2:
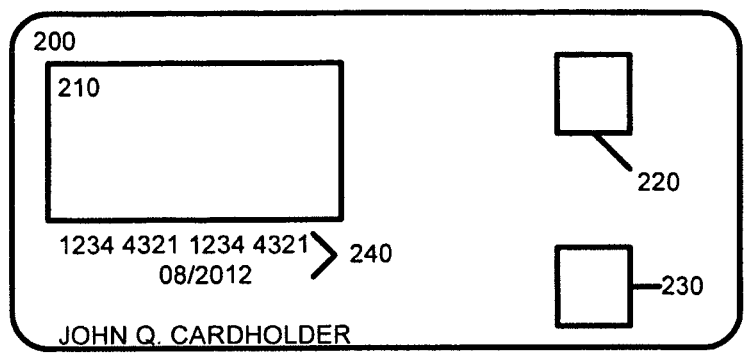
FIG. 2 is a front view of a card capable of providing automatic notification in accordance with an embodiment of the invention.

FIG. 2 is a front view of a card 200 capable of providing automatic notification in accordance with an embodiment of the invention. The card 200 may include embossed letters and numbers 240 which identify the cardholder, an account number, and an account expiration date. The card 200 may further include a display screen 210, a conventional design element such as a hologram 220, and a logo 230 denoting a credit issuing authority. The logo 230 may be provided denoting the issuing authority such as VISA®, MASTER-CARD®, DISCOVER®, AMERICAN EXPRESS®, or other card issuers. The front face of the card 200 may further include printed letters 250 denoting the financial institution issuing the card. In alternative embodiments, the display screen 210 may be configured to display a logo, the issuing authority, and/or the financial institution so that it is not necessary to print this information on the card 200.

As is known in the art, if the card 200 is used as a credit card, the account number shown at 240 identifies the credit account from which charges are deducted when a purchase, reservation, or cash advance is made.

The card 200 can be, for example, a debit card, a credit card, a transfer funds card, a smart card, a stored-value card, a gift card, an ATM card, a security card or-an identification card. The card may also include components for providing or processing either account, identity, payment, health, transactional, or other information and communicating with central processing units or computers operated by the providers of services, such as credit card institutions, banks, health care providers, universities, retailers, wholesalers or other providers of goods or services employers, or membership organizations. Card features may also enable the card to communicate with or be accessed by other devices, including those used by retailers (point of sale computers), and personal computers used in other business applications or at home for example personal computer using a built-in or attached card reader.

The display 210 may be a thin, flexible LEP display including a semiconductor layer in the form of a thin dense polymer film comprising at least one conjugated polymer, a first electrode in contact with a first surface of the semiconductor layer and a second electrode in contact with a second surface of the semiconductor layer. The polymer film should have a sufficiently low concentration of extrinsic charge carriers, so that on applying an electric potential between the first and second electrodes in a manner that renders the second electrode positive relative to the first contact layer, charge carriers are injected into the semiconductor layer and light is emitted from the semiconductor layer.

In yet another embodiment, the LEP display 210 comprises an electron transporting layer in contact with an electron blocking polymer, the electron blocking polymer incorporating a network electrode polymer. The LEP display is connected to a source of electrical current via electrodes so as to supply the electron transporting polymer with a flow of electrons, and to cause an electroluminescent emission from the heterojunction between the electron transporting polymer and the electron blocking polymer. The electron transporting polymer may be any conductive polymeric material of appropriate conductive and electron affinity characteristics to allow it to act as the electron transporting polymer in a light emitting device. Likewise, the electron blocking polymer may be any polymeric material of appropriate electron blocking-polymer characteristics to allow it act as the electron blocking polymer in a light emitting device. The network electrode polymer may be any polymeric material that forms an electrically conducting network polymeric structure within the electron blocking polymer.

Suitable light emitting polymeric materials include conjugated polymers such as poly(.rho.-phenylene vinylene) (PPV), PPV derivatives, pyridine containing polymers and copolymers such as poly(.rho.-pyridine) (PPy), poly (.rho.-pyridyl vinylene) (PPyV), copolymers of PPyV and PPV derivatives (PPyVP(R).sub.2 V) with various functional side groups R.dbd.C.sub.12 H.sub.25, OC.sub.16 H.sub.33, COOC.sub.12 H.sub.25, strapped copolymer, and other conjugated polymers and copolymers.

The LEP display may cover, for example, a portion of the surface of the card or it may cover the whole surface of at least one side of the card. Other types of displays may also be implemented.

In addition to LEP displays, other types of displays are known in the art. The display may be a liquid crystal display (LCD), a field emission display (FED), a surface conduction electron-emitter display (SED), an the interferometric modulator (IMOD) display, or vacuum fluorescent display (VFD). Other technologies may also be implemented.

The information appearing on the display may, for example, be an image, characters, numbers or any combination thereof. The display may be touch-sensitive, e.g., it may provide the user with a number of graphical images which enable the user to select an option by touching selected parts of the touch-sensitive display. As will be described further in connection with FIGS. 3-5, the card may be configured to receive communications that appear on the touch sensitive display from a host computer and transmit information to a POS terminal or ATM via a magnetic strip, contacts, or other mechanism. The card may also be configured with a transmitter to transmit information directly to a host computer and a receiver to receive information directly from the host computer. Thus, the card may have multiple communication capabilities to communicate bi-directionally with multiple devices.

The display 210 may be programmed to include a screen saver function that by default includes the card issuer logo. A security function may be provided so that the display must be activated by the cardholder in order to be operable. Furthermore, the security function may cause a photograph of the cardholder to be displayed in order to discourage unauthorized use.

Card 200 has width, length, and thickness dimensions similar to those of conventional plastic cards. For example, a card 10 may be about 86 mm long, about 55 mm wide, about 0.8 mm thick, and may meet other ISO Standards associated with such cards.

Figure 3:
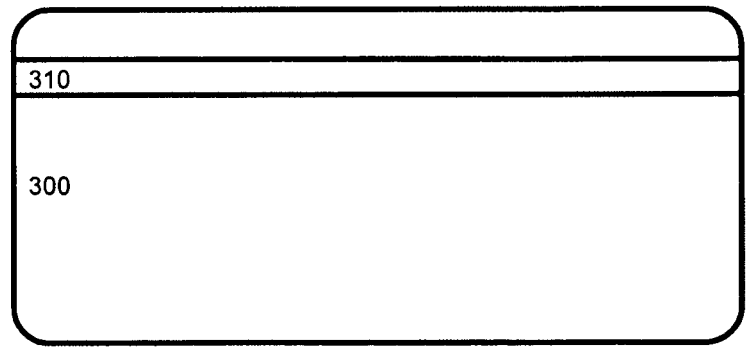
FIG. 3 is a rear view of a card capable of providing automatic notification in accordance with an embodiment of the invention.

FIG. 3 is a rear view of a card capable of providing automatic notification in accordance with an embodiment of the invention. The rear face of the card 300 includes a magnetic strip 310. The magnetic strip 310 may store information and may be positioned on the card in a manner that allows it to be read simply swiping it in a conventional magnetic reading device such as an ATM machine or any other magnetic strip reader.

It should be understood that the present invention is not limited to the aforementioned configuration and positioning of the magnetic strip and that other embodiments can be envisioned by a person skilled in the art from the disclosure of the present invention. For example, the magnetic strip may be repositioned or additional magnetic strips may be included on the front or the rear face of the card.

Figure 4:
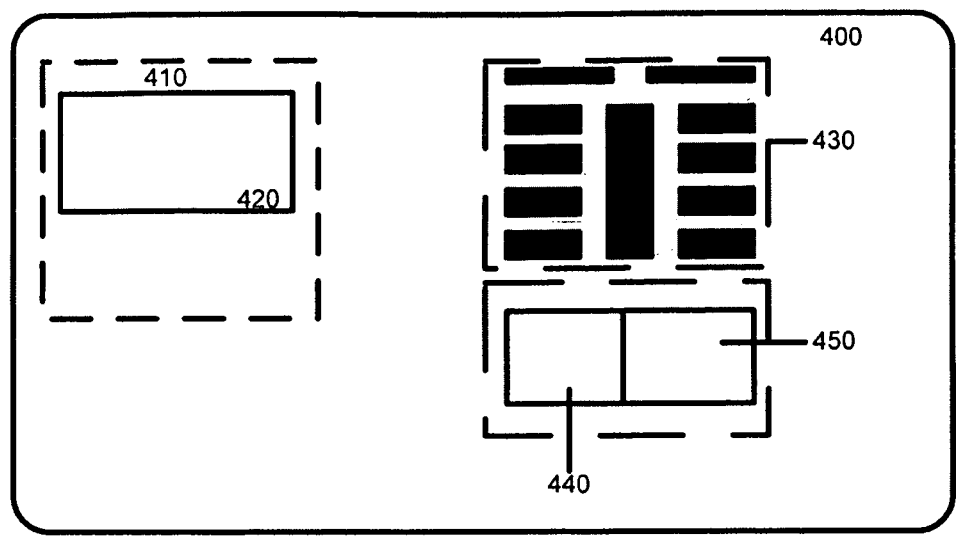
FIG. 4 is a front view illustrating further features of a card for providing automatic notification in accordance with an embodiment of the invention.

Referring now to FIG. 4, another embodiment illustrating a card 400 is provided. The card 400 may have contacts 430 exposed through a hole in a front protective covering. The contacts 430 may allow peripheral devices including card readers to access information held within a microprocessor 440. A second microprocessor 450 may be provided to drive a display 420. The display 420 may be a flexible LEP display as described above. A thin film battery 410 may be printed on a supporting substrate of the card 400 and may be connected to the display 420 and its controlling microprocessor 450. The contact interfaces 430 are preferably positioned on the card to allow scanning or reading using conventional smart card readers.

Figure 5:
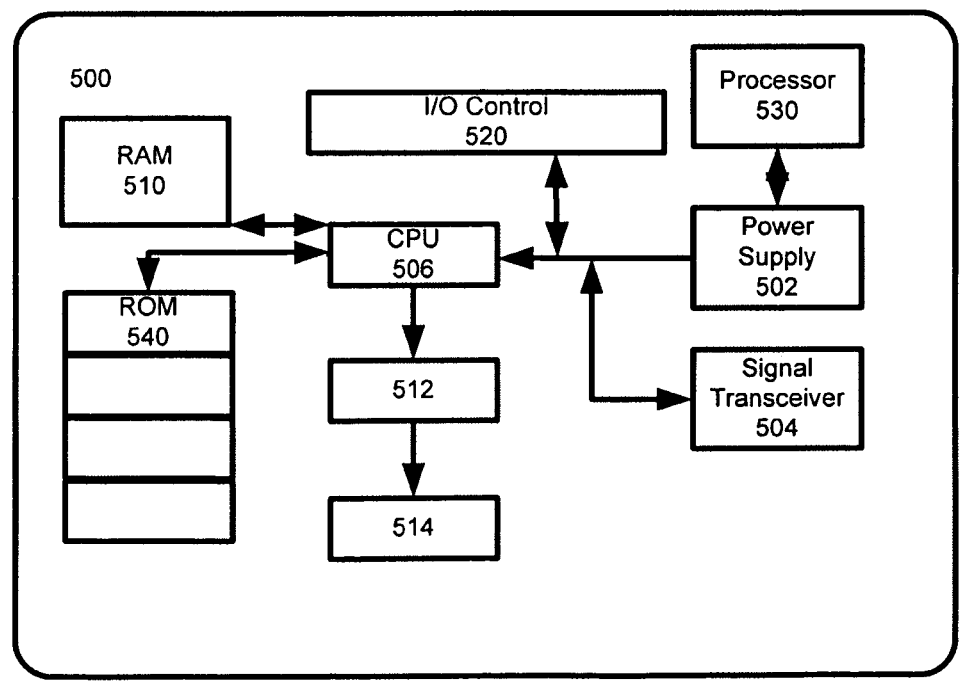
FIG. 5 is a block diagram illustrating additional components of a card capable of providing automatic notification in accordance with an embodiment of the invention.

FIG. 5 is a block diagram illustrating additional components of a card 500 capable of providing automatic notification in accordance with an embodiment of the invention. Card 500 includes a central processing unit (CPU) 506, a read-only memory (ROM) 540, dynamic memory (RAM) 510, a power supply system 502, an input control circuit 520, a magnetic strip controller 512 and an inductor 514.

The power supply system 502 may be any of many well known systems such as, for example, a solar cell connected to a rechargeable battery. In operation, the CPU 506 receives power from the power supply system 502 and distributes the power to the other systems and circuits by a programmed sequence of steps which is stored in the ROM 540.

An I/O interface 520 may take the form of a contact with the external system, or a peripheral thereof, for proper transfer of signals. Alternatively, the I/O interface may take the form of a radio frequency (RF) interface for allowing communication between the smart card and the external system via the transmission and reception of RF signals. The external system may take the form, for example, of a card reader, a merchant's point of sale system, or an automated teller machine. As illustrated, a separate signal transceiver 504 may be provided for communicating between an additional external system or for providing a separate communication channel. Alternatively, the card 500 may be equipped only with a receiver device or with separate transmitter and receiver devices.

Processor 530 may be provided to independently drive a display. Alternatively, the display may be controlled by the CPU 520.

Data to be communicated into a card reading mechanism may be output from a processor and converted by magnetic strip control circuit 512. Magnetic strip control circuit 512 may output a signal that drives an inductor 514 to generate a magnetic field pattern which can be read by a card reading device. Signals representing the data to be communicated may be output serially, thus emulating data encoded on a magnetic strip. Preferably, the data is only temporarily preserved on the magnetic strip. The processor may supply a signal to the magnetic strip control circuit which eliminates the generation of the magnetic field, thereby decoding or erasing the magnetic strip. All of the aforementioned components may be fabricated onto a single integrated chip comprising a microprocessing/controller unit (MPU).

Figure 9:
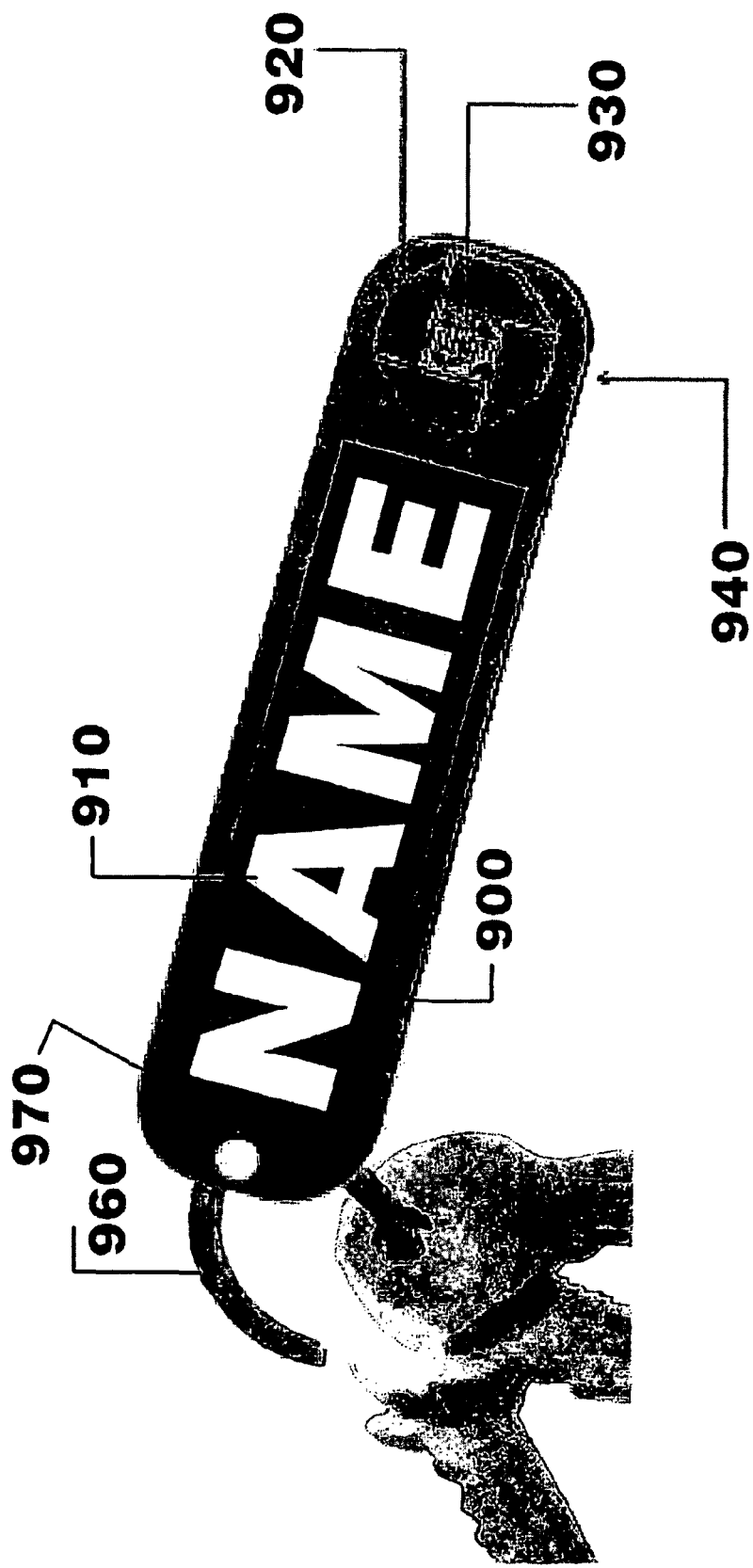
FIG. 9 is a perspective view illustrating a device capable of providing automatic notification in accordance with another embodiment of the invention.

FIG. 9 illustrates an embodiment of the invention implemented in conjunction with a device 900 that may be attached to a keychain 960. The device 900 may be a contactless RFID device or other type of device carrying communications equipment to communicate in a contactless manner with a terminal. The device 900 may include a company name 910. The company name 910 may be printed on the device 900 or alternatively may be provided on an LCD, LEP, or other type of display featured on the device 900. A logo or symbol 920 may also be provided on the device 900. The logo or symbol 920 may include one or more LEDs, enabling the logo or symbol 920 to glow upon activation. In the illustrated embodiment, an additional symbol 930 may be embedded within the symbol 920 and may itself glow upon activation.

Given its contactless communication capabilities, the device 900 may facilitate entry into ATM areas that normally require a card to be swiped for entry. Swiping a card can be extremely inconvenient for cardholders carrying groceries or escorting children. The device 900 may either be equipped with internal processing devices as described above or may receive a signal from an external source such that the logo or embedded symbol would glow or flash upon completion of transaction. The device 900 may be equipped with a switch that allows selection of one of multiple modes. The switch may be located on a front or back surface of the device and may have multiple settings, such as vibrate, glow, flash, or beep or other sounding mode. The device 900 may be equipped with a battery 940 or may receive power from an RF source.

The device 900 may also be equipped with a locator function. For example, the device 900 may receive a command to vibrate, glow, flash, beep, etc., in order to facilitate user location of the device 900. In order to activate this function, a user may be able to access a central facility via telephone, internet, or other connection mode. In response, the central facility may be able to remotely activate the locator function. Alternatively, the user may be independently capable of remotely activating the locator function.

The company name 910 and logo 920 may be displayed on either side of the device 900. In embodiments of the invention, an entire face of the device 900 could comprise a display such as an LCD display and the entire display may be activated to glow or flash.

In alternative embodiments, the device 900 may have transmission capabilities to communicate with a cellular phone via Bluetooth or other wireless protocol. The device 900 may cause a message to be sent to the cellular phone directing the user to call the card issuer or financial institution immediately or to take other similar action.

In other embodiments, the logo 920 may be provided with activation capabilities. Thus, a purchase can be made either by automatic contactless communication with a terminal or by using a button, such as a logo button. Thus, pressing the logo 920 may cause the device 900 to be activated to make a purchase and may cause the device 900 or a portion of the device 900 to glow, vibrate, or otherwise signal the user. If an LCD or other display panel is included on the device 900, The display panel may read "accepted" or declined" after the logo 920 is pressed. The display panel may also be implemented to display other types of account-related messages, such as promotion messages, service-oriented messages, or fraud prevention messages.

In order to enhance security of the device 900, the device 900 may be disabled automatically upon user request. For example, the user may contact a central facility through a provided telephone number or website and the central facility may respond by disabling purchasing capability of the device.

The device 900 is preferably made of a durable plastic or metal. The design should preferably airtight to protect against the elements. Edges may be rounded in order to facilitate comfort when the device is carried in a user's pocket. Even when not in use, portions of the device 900 such as the logo 920 may be configured to glow in order to increase visibility.

Figure 6:
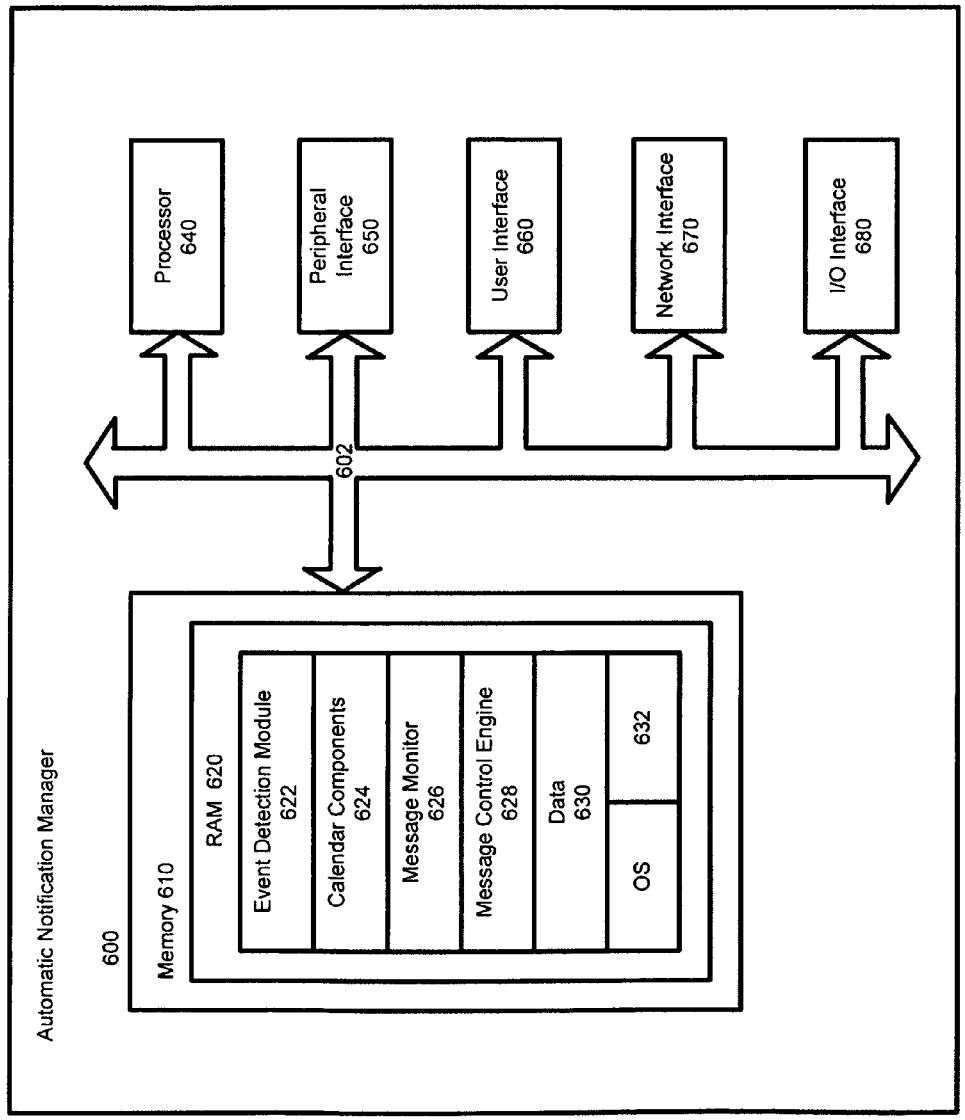
FIG. 6 is a block diagram illustrating components of an automatic notification system in accordance with an embodiment of the invention.

FIG. 6 is a block diagram illustrating components of an automatic notification manager 600 in accordance with an embodiment of the invention. The automatic notification manager 600 may include a memory 610, a processor, 640, a peripheral interface 650, a user interface 660, a network interface 670, and additional I/O interface 680 connected over a system bus to one another. The additional I/O interface may be capable of functioning to receive and transmit cellular, satellite, RF, or other types of signals.

The memory 610 may include the features described above such as a RAM 620. The RAM may store data 630, an operating system 632, and multiple program modules. The multiple program modules may include an event detection module 622, a calendar component 624, a message monitor 626, and a message control engine 628.

The event detection module 622 may detect events related to card usage and account usage generally. For instance, the event detection module may detect the usage of a card in an ATM machine or POS terminal. The event detection module 622 may also detect the usage of an account number connected with the card over the telephone or through a personal computing device connected over the Internet with a web site.

The calendar component 624 may determine date and timing information related to individual accounts. For instance, the calendar component 624 may inform the message control engine 628 when a payment due date is upcoming, when a payment is overdue by a set number of days, when card renewal is required, or when other predetermined time-related events occur. In additional embodiments, the calendar component 624 may keep track of personal dates such as a cardholder's birthday or number of years as a cardholder. The occurrence of such a tracked date may trigger a message such as "Call our toll free number to receive your free gift today."

The message control engine 628 may transmit messages to the card based on notifications received from the calendar component 624 and the event detection module 622. These messages may include reminders, promotional or marketing materials, verification requests to prevent fraud, notification of card activity, and other messages.

The message monitor 626 may monitor messages sent to the card through the message control engine 628. The message monitor may 626 may trigger deletion of old messages. In some embodiments, card users may receive reward or incentive points for reading messages as tracked by the message monitor 626.

Figure 7:
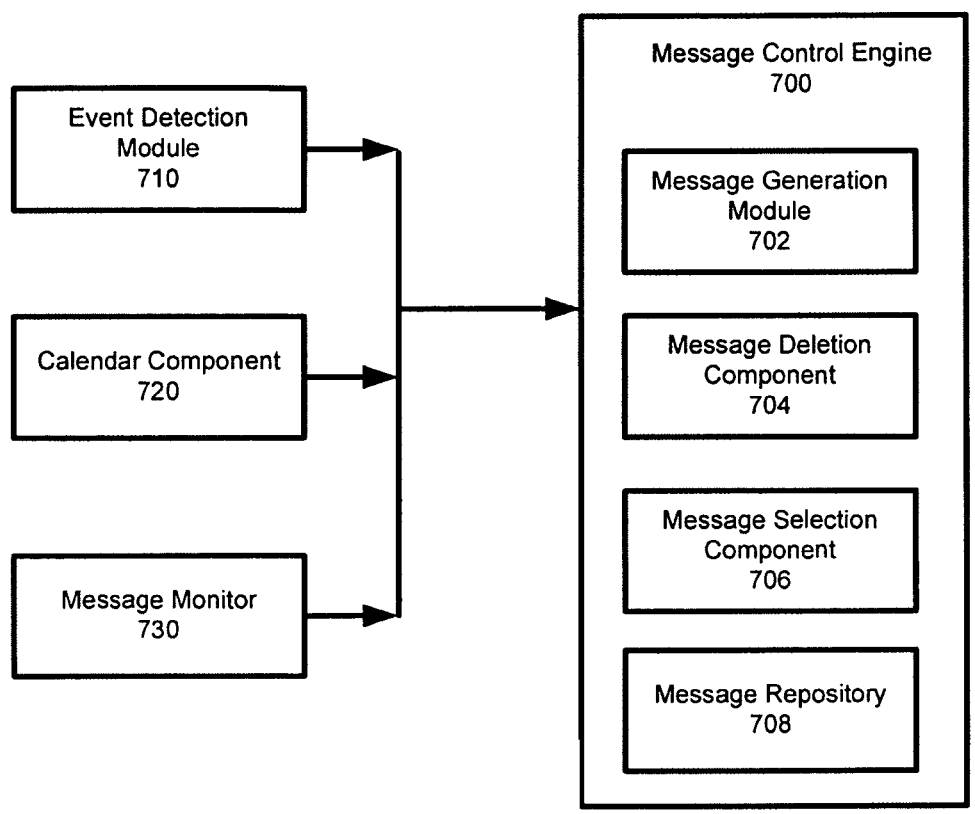
FIG. 7 is a block diagram illustrating interaction between components of the automatic notification system in accordance with an embodiment of the invention.

FIG. 7 is a block diagram illustrating interaction between components of the automatic notification manager 600 in accordance with an embodiment of the invention. An event detection module 710, a calendar component 720, and a message monitor 730 convey their findings to a message control engine 700. The message control engine 700 may include multiple components such as a message repository 708, a message selection component 706, a message deletion component 704, and a message generation module 702. Upon notification from the event detection module 710, the calendar component 720, and the message monitor 730, the message control engine 700 may operate to generate an automatic notification that will be transmitted to the card through the automatic notification manager.

The message generation module 702 may generate a message based on the information conveyed through any of the event detection module 710, the calendar component 720, and the message monitor 730. The message generation module 702 may also generate a new message when the message monitor 730 detects deletion of an old message.

The event detection module 710 may detect events through messages sent by a system internal to the card or through messages sent by a POS or ATM system or a personal computer. Thus, the transmission from the card may be powered by a POS device. In any of these cases, the event detection module 710 would be responsive to card usage attempts and may trigger a validation transmittal to the card, such as the display of a photograph of the cardholder.

The message deletion component 704 may operate when the message monitor 730 indicates that a message has been read or when the message has not been read, but has reached a predetermined expiration.

The message selection component 706 may be responsive to the message received from the event detection module 710, the calendar component 720, and the message monitor 730 to retrieve an appropriate message from the message repository 708. The message repository 708 may contain standard message types, which are periodically updated by the message generation module 702.

The message selection component 706 may be responsive to an event such as an account opening and send a message to the card advising the account holder to call a predetermined telephone number to supplement the activation process. Upon reaching that telephone number, the account holder may receive offers for products that would logically be selected upon opening of a new account. If the account holder calls the number, or a predetermined time after the account holder reads the message, the message control engine 700 may implement the message deletion component 704 to delete the message from the card display in order to allow for more messages.

The message generation module 702 may send multiple types of account-related messages depending on the triggering event. The account-related messages may be promotional, service oriented, or fraud prevention oriented.

A promotional message may, for example, advise a user to call a displayed number to find out how to reduce an interest rate or obtain a free credit report. The promotional messages may be a teaser message in order to capture the attention of a cardholder instantaneously since the display has limited space and the card holder may have limited time to view the messages. The teaser messages are typically sent to motivate further communication. A teaser message may read, for example "Call to find out how to protect your credit". In order to encourage viewing of promotional messages, the automatic notification manager may offer card holders rewards points or other types of rewards for viewing the promotional messages.

Service oriented messages may allow cardholders to check an account balance, to determine payment status, or to find a next payment due date. The service oriented messages may further advise account holders regarding recent usage and expenditures, credit limits, and other information of concern to an account holder.

Fraud prevention messages may be designed to add account protection measures. The card screen may be capable of thumbprint verification or biometrics validation. A message may be sent from the automatic notification system to the card to indicate validation has occurred. Furthermore, if the card number is entered into an Internet site for a purchase, the event detection module 710 may notify the message generation engine that an event has taken place. The message generation module 702 may send a message to the card requesting validation. Thus, validation through two channels may be required. If a fraudulent user attempts to enter a credit card number he has obtained, the holder of the card will be notified through the message that is sent directly to the card. The message to the card may indicate that verification is occurring and that the user has just placed an order. The message may further request that the card holder respond if he wishes to continue with the order. Furthermore, the message generation module 702 may generate a photograph of the cardholder to display on the card display for fraud prevention purposes.

A similar message may be sent to the card when the user enters data at a POS terminal, thus creating an independent verification channel. For example, the generated message may read "You've charged $57.23. Do you accept this?" Furthermore, with this additional verification technique, it would be possible to conduct all transactions at a place of business through the card itself, rather than using the POS terminal.

As a practical example, if the event detection module 710 detects card usage at a point of sale terminal, the message control engine 700 may respond by sending a message to the card since the account holder will most likely be available to view the message. All types of messages may be sent during authorization in order to increase the chances of the messages being read, but other timing options are also possible. The message may offer a special discount, give the user a current balance, or request that the user access a website or a telephone number. The message may also request a payment or advise the account holder of an upcoming payment due. Alternatively, the message may advise the account holder of a credit limit and advise the credit limit to contact a telephone number in order to raise the credit limit. Under certain circumstances, as a safety precaution, the message control engine 700 may advise the account holder to call a number to validate identity.

In embodiments of the invention, the display mechanism may be operable in multiple modes, including the screen saver mode, an off mode, a POS mode, a message receipt mode, an account status mode, and other modes. Other modes may include flashlight mode, card status mode, and security mode. The card thus becomes a point of active interaction dialogue with the customer.

Figure 8:
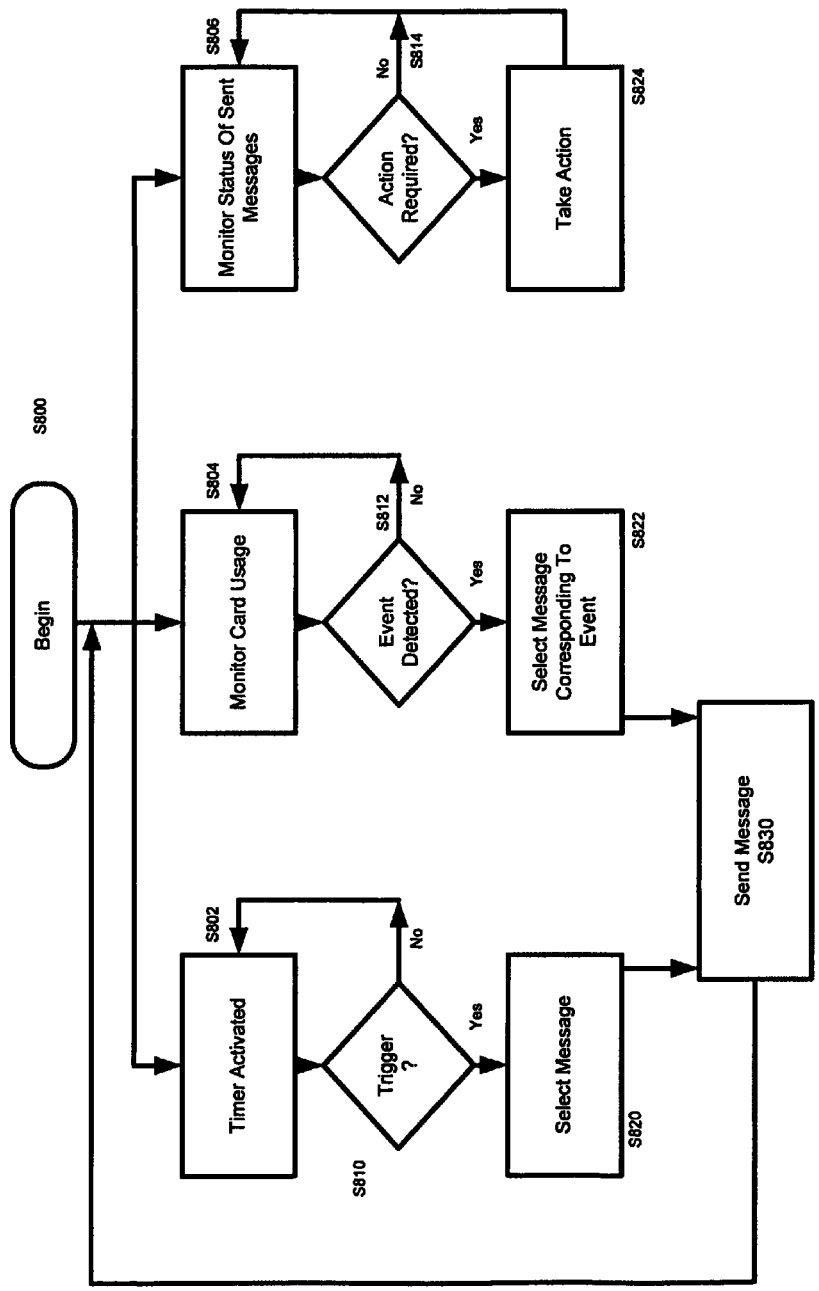
FIG. 8 is flow chart illustrating a method for automatic card notification in accordance with an embodiment of the invention.

FIG. 8 is flow chart illustrating a method for automatic card notification in accordance with an embodiment of the invention. The method begins in S800 and the system through its calendar components activates a timer in S802, monitors card usage in S804, and monitors the status of any sent messages in S806.

If the timer triggers an event in S810, the system selects a message in S820 and sends the message in S830. Similarly, if a card usage event is detected in S812, the system selects a corresponding message in S822 and sends the message in S830.

With respect to sent messages monitored in S806, it may at some time become necessary to take action such as deletion, moving, or re-sending the message in S814. If such action is necessary, the system takes this action in S824 and then returns to its monitoring state.

Although many other internal components of the computer are not shown, those of ordinary skill in the art will appreciate that such components and the interconnections are well known. Accordingly, additional details concerning the internal construction of the computer need not be disclosed in connection with the present invention.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer-implemented system, operating in conjunction with a financial account, for automatically conveying information to an account holder, the system comprising:
   a card associated with the financial account, the card including a display, a processor, and a signal receiving mechanism for receiving a remotely generated wireless radio frequency signal;
   a host computing system remote from the card, the host computing system including;
      a computer memory storing message information and instructions;
      a computer processor accessing the computer memory and executing the stored instructions;
      an event detection module executed by the computer processor for detecting an event related to the financial account, the event including an attempted transaction accessing the financial account;
      a message selection component communicating with the event detection module for selecting an account-related message corresponding to the event detected by the detection module, wherein the account-related message is selected from available fraud prevention messages, the account related message including a telephone number accompanied by a request for the account holder to call the telephone number and a photograph of the cardholder; and
      a message generation module for generating the account-related message and transmitting the account-related message via the radio frequency signal directly to the signal receiving mechanism on the card associated with the financial account, wherein the processor of the card conveys the account-related message received from the message generation module to the display of the card.

2. The system of claim 1, further comprising a message repository for storing account-related messages, wherein the message selection component selects the account-related message from the message repository.

3. The system of claim 1, further comprising a calendar component for triggering generation of time dependent messages related to the financial account.

4. The system of claim 1, wherein the event detection module detects card usage at a POS terminal.

5. The system of claim 4, wherein the event detection module detects card usage at the POS terminal as a result of a transmission from the POS terminal.

6. The system of claim 4, wherein the event detection module detects card usage at the POS terminal as a result of transmission from the card.

7. The system of claim 1, wherein the account-related message requests further communication from the account holder.

8. The system of claim 7, wherein the further communication comprises one of telephone communication and Internet communication.

9. The system of claim 1, wherein the account-related message is a promotional message.

10. The system of claim 7, wherein the account-related message is a fraud prevention message requesting user validation in order to complete the detected event.

11. The system of claim 1, wherein the account-related message is a service oriented message.

12. The system of claim 1, wherein the event detection module detects attempted card usage from a personal computer and wherein the generated message requires a response in order to allow completion of the card usage on the personal computer.

13. A device capable of providing automatic notification to an account holder, the device associated with a financial account, the device comprising:
   a card providing access to the financial account;
   a signal receiving mechanism for receiving a radio frequency signal generated from a remote host computing system, the signal receiving mechanism disposed on the card for receiving an account-related message upon detection of an attempted transaction accessing the account, the message received directly by the signal receiving mechanism on the card from a message control engine located at the remote host computing system, wherein the message control engine selects the account related message based on detection of an account-related event, wherein the account-related message is selected from available fraud prevention messages, the account related message including a telephone number in conjunction with a request for the account holder to call the telephone number and a photograph of the account holder;
   a display on a face of the card for displaying the account-related message received through the signal receiving mechanism; and
   a processor disposed on the card for controlling the appearance of the account-related message on the display of the card.

14. The device of claim 13, wherein the display comprises an LEP display.

15. The device of claim 13, further comprising a signal transmission component for sending messages to a host of the remotely located message control engine.

16. The device of claim 13, further comprising multiple selectable display modes.

17. The device of claim 16, wherein the multiple selectable display modes comprise at least a screen saver mode and a message viewing mode.

18. The device of claim 13, further comprising a communication mechanism for communicating with a point of purchase device.

19. The device of claim 18, wherein the point of purchase device is a POS terminal and the communication mechanism comprises at least one magnetic strip.

20. The device of claim 18, wherein the point of purchase device is a smart card reader and the communication mechanism comprises exposed contacts.

21. The device of claim 13, wherein the account-related message is a promotional message prompting communication from the cardholder.

22. The device of claim 13, wherein the account-related message is a fraud prevention message prompting communication from the cardholder.

23. The device of claim 13, wherein the account-related message is a service oriented message requesting communication from the cardholder.

24. A computer-implemented method for automatically conveying information from a message control engine to a card associated with a financial account, the card having a signal receiving mechanism, the method comprising:

detecting an event associated with the financial account, the event including an attempted transaction to access the financial account, the detection occurring at a host computer located remotely from the card, the host computer including a computer memory for storing instructions and a computer processor accessing the computer memory and implementing an event detection module;

selecting a message corresponding to the event using a message selection component of the host computer, wherein the account-related message is selected from available fraud prevention messages, the account related message including a telephone number accompanied by a request for the account holder to call the telephone number and a photograph of the cardholder;

generating the selected message using a message generation module;

transmitting the generated message using the message generation module of the host computer directly to the signal receiving mechanism on the card using a radio frequency signal; and displaying the transmitted message on a display positioned on a face of the card.

25. The method of claim 24, further comprising providing a message repository for storing account-related messages, wherein the message selection component selects the account-related message from the message repository.

26. The method of claim 24, further comprising triggering generation of time dependent messages related to the financial account through a calendar component.

27. The method of claim 24, further comprising detecting card usage at a POS terminal.

28. The method of claim 27, further comprising detecting card usage at the POS terminal as a result of a transmission from the POS terminal.

29. The method of claim 27, further comprising detecting card usage at the POS terminal as a result of transmission from the card.

30. The method of claim 24, further comprising requesting further communication from a card holder through the displayed message.

31. The method of claim 30, wherein the further communication comprises one of telephone communication and Internet communication.

32. The method of claim 24, further comprising transmitting a promotional message.

33. The method of claim 24, further comprising transmitting a fraud prevention message requesting user validation in order to complete the detected event.

34. The method of claim 24, further comprising transmitting a service oriented message related to the financial account.

* * * * *